(12) United States Patent
Baaren

(10) Patent No.: US 11,577,183 B2
(45) Date of Patent: Feb. 14, 2023

(54) SYSTEM FOR DEGASSING AND/OR SEPARATION OF FLUID STREAMS AND METHODS OF USING SAME

(71) Applicant: FMC Technologies, Inc., Houston, TX (US)

(72) Inventor: Sander Baaren, Houston, TX (US)

(73) Assignee: FMC TECHNOLOGIES, INC., Houston, TX (US)

( * ) Notice: Subject to any disclaimer, the term of this patent is extended or adjusted under 35 U.S.C. 154(b) by 658 days.

(21) Appl. No.: 16/519,747

(22) Filed: Jul. 23, 2019

(65) Prior Publication Data
US 2021/0023477 A1    Jan. 28, 2021

(51) Int. Cl.
*B01D 19/00* (2006.01)
*F28F 9/02* (2006.01)
*E21B 43/34* (2006.01)

(52) U.S. Cl.
CPC ........ *B01D 19/0073* (2013.01); *F28F 9/0231* (2013.01); *B01D 19/0063* (2013.01); *B01D 19/0068* (2013.01); *E21B 43/34* (2013.01)

(58) Field of Classification Search
None
See application file for complete search history.

(56) References Cited

U.S. PATENT DOCUMENTS

| | | |
|---|---|---|
| 4,308,106 A | 12/1981 | Mannfeld |
| 6,009,727 A | 1/2000 | Grant et al. |
| 6,099,727 A * | 8/2000 | Buehl .............. C10M 175/0058 210/259 |
| 8,465,572 B1 * | 6/2013 | Ball, IV ............... B01D 17/042 96/184 |
| 2014/0262171 A1 * | 9/2014 | Ljubicic ................ B21D 53/06 29/890.03 |

(Continued)

FOREIGN PATENT DOCUMENTS

DE        2851112 A1     6/1980

OTHER PUBLICATIONS

International Search Report issued in International Application No. PCT/US2020/042319 dated Sep. 9, 2020 (4 pages).

(Continued)

*Primary Examiner* — Christopher P Jones
*Assistant Examiner* — Phillip Y Shao
(74) *Attorney, Agent, or Firm* — Osha Bergman Watanabe & Burton LLP

(57) ABSTRACT

One method disclosed herein of processing a process fluid that comprises dissolved gas includes performing a degassing process on the process fluid by heating the process fluid via heat transfer with a heat transfer fluid, wherein at least some amount of the heat transfer fluid condenses in the first heat transfer process and latent heat of the heat transfer fluid as it condenses is used to increase the temperature of the process fluid. Thereafter, the heat transfer fluid is passed through an expansion device so as to produce a post-expansion heat transfer fluid. The temperature of the heated process fluid is decreased by performing a second heat transfer process between the post-expansion heat transfer fluid and the heated process fluid, wherein the temperature of the post-expansion heat transfer fluid is increased and the latent heat that was supplied to the process fluid in the first heat transfer process is removed.

18 Claims, 7 Drawing Sheets

(56) References Cited

U.S. PATENT DOCUMENTS

2016/0158763 A1* 6/2016 Sano .................. B03B 5/48
                                                          62/503
2018/0028935 A1* 2/2018 Sano ................ C02F 1/283

OTHER PUBLICATIONS

Written Opinion issued in International Application No. PCT/US2020/042319 dated Sep. 9, 2020 (8 pages).

* cited by examiner

SYSTEM FOR DEGASSING AND/OR SEPARATION OF FLUID STREAMS AND METHODS OF USING SAME

BACKGROUND

1. Field of the Disclosure

The present disclosure is generally directed to various novel embodiments of a system for degassing and/or separation of a fluid stream and methods of using same.

2. Description of the Related Art

In many applications and many industries, it is desirable to remove dissolved gas in a fluid stream. For example, gases dissolved in liquids can cause unexpected trouble in fluidic systems as gas molecules can form bubbles when the pressure and/or temperature of the liquid changes. The presence of such gas bubbles can affect the performance of the equipment used in such fluidic systems and/or attack the materials of construction of such equipment. Air or oxygen may be removed from a liquid stream when the downstream equipment or components may be sensitive to such gases, e.g., these gases may cause undesirable pitting or rusting of downstream equipment. For a fluid stream that contains multiple liquids, it may also be desirable to separate the liquids in the fluid stream from one another. The separation of liquids in a fluid stream may be performed with or without degassing the fluid stream. There are various techniques for degassing fluid streams and/or separating liquids in a fluid stream that includes multiple liquids.

As one example, a hydrocarbon-containing fluid stream may be a multiphase fluid comprising, for example, a mixture of oil, free and dissolved gas and/or water. The multiphase fluid may be subjected to various separation processes to separate some or all of the gas and/or water from the oil. In some applications, these separation processes may involve heating the hydrocarbon-containing fluid to certain temperatures so as to achieve the desired separations of the water and gas from the oil. In certain oilfields, the multiphase hydrocarbon flow stream contains primarily oil with lesser quantities of water, gas and possibly sediment (i.e., solids) fractions. In addition, the oil may contain a number of light end hydrocarbons, which can be defined as the more volatile components of the crude oil, such as methane, butane, ethane and propane. At some point prior to the oil refining process, the water, gas and sediment must be removed from the oil in order to meet custody transfer specifications for basic sediment and water (BS&W) content and volatility (e.g., Reed Vapor Pressure).

Separation systems which use heat to facilitate the separation of water and light end hydrocarbons from oil are commonly referred to as heater-treaters. An example of a prior art heater-treater separation system is shown in FIG. 1. This separation system, generally 10, includes a horizontal separator vessel 12 having an upstream end 14, a downstream end 16, a multiphase fluid inlet 18, a gas outlet 20, a water outlet 22 and an oil outlet 24. The internal volume of the separator vessel 12 is generally divided into a heating section 26, a separation section 28 and an oil accumulation section 30. The heating section 26 is separated from the separation section 28 by a divider plate 32, and the separation section 28 is separated from the oil collection section 30 by an overflow weir 34.

In this example, the separation system 10 employs a fire tube heater to heat the hydrocarbon fluid as it flows through the heating section 26. The fire tube heater comprises a U-shaped fire tube 36 (also referred to as a heat tube or a burner tube) which is heated by a gas burner 38. In operation, the burner 38 ignites a flame which produces radiation heat transfer and hot combustion gases that flow through and heat the metal wall of the fire tube, which in turn heats the hydrocarbon fluid.

However, fire tube heaters have several major drawbacks. For example, fire tube heaters are not easily scalable for large flowrates due to the low heat transfer surface area to volume ratio. Thus, for large flowrates, several parallel fire tubes are normally required. Also, the trend in field development for the shale market is shifting towards the use of Central Production Facilities, where oil from several well-pad locations is processed. This requires the use of many fire tubes at a single facility, which is not cost effective.

In addition, fire tube heaters require that the fire tube be positioned within the separator vessel. As a result, the flame contained in the fire tube is present inside the vessel where the hydrocarbon flow stream is processed, which creates a safety concern. Furthermore, because the hydrocarbon fluid is heated by a metal tube containing a flame, the temperature of the metal tube cannot be accurately controlled. Moreover, the temperature is usually high enough to cause the oil to boil, which can result in pitting of the tube material. The high temperature of the fire tube can cause fouling of the surface of the tubes by coke and scale deposits, which can inhibit heat transfer and reduce the thermal efficiency of the fire tube heater over time. When the heat transfer is impaired by fouling, the temperature of the tube material can rise to levels that compromise the mechanical integrity of the fire tube material, which may result in fire tube collapse which, in some cases, may lead to loss of containment and fire. Accordingly, fire tubes need regular maintenance and inspections in an effort to avoid such situations and problems. Also, the flame inside of a fire tube can result in a hot spot on the fire tube if the burner of the fire tube is not properly controlled or managed. Another drawback of fire tube heaters is emissions of greenhouse gasses and NOx produced by operation of such heaters. Furthermore, fire tubes are connected to the separator vessel by a relatively large and complicated flange, which is costly to produce and install.

The present disclosure is therefore directed to various novel embodiments of a system for degassing and/or separation of a fluid stream and methods of using same that may eliminate or reduce one of more of the problems identified above.

SUMMARY OF THE DISCLOSURE

The following presents a simplified summary of the present disclosure in order to provide a basic understanding of some aspects disclosed herein. This summary is not an exhaustive overview of the disclosure, nor is it intended to identify key or critical elements of the subject matter disclosed here. Its sole purpose is to present some concepts in a simplified form as a prelude to the more detailed description that is discussed later.

The present disclosure is generally directed to various novel embodiments of a system for degassing and/or separation of a fluid stream and methods of using same. One illustrative system disclosed herein includes a compressor, a process fluid heat exchanger that is adapted to receive a heat transfer fluid from the compressor and a process fluid, wherein, due to heat transfer, a heated process fluid exits the process fluid heat exchanger and an expansion device that is adapted to receive heat transfer fluid that exits the process fluid heat exchanger. This embodiment of the system also includes a heat recovery heat exchanger that is adapted to receive heat transfer fluid that exits the expansion device and the heated process fluid, wherein the heat recovery heat exchanger is further adapted to decrease a temperature of the heated process fluid as it flows through the heat recovery heat exchanger via heat transfer with the heat transfer fluid flowing through the heat recovery heat exchanger so as to produce a cooled process fluid that exits the heat recovery heat exchanger.

One illustrative method disclosed herein of processing a process fluid that comprises dissolved gas includes performing a degassing process on the process fluid by performing a first heat transfer process between the process fluid and a heat transfer fluid so as to increase a temperature of the process fluid, wherein at least some amount of the heat transfer fluid condenses in the first heat transfer process and latent heat of the heat transfer fluid as it condenses is used to increase the temperature of the process fluid, the increase in temperature of the process fluid resulting in the removal of at least some of the dissolved gas within the process fluid, whereby the process fluid exits the first heat transfer process as a heated process fluid and, after performing the degassing process, passing the heat transfer fluid though an expansion device so as to produce a post-expansion heat transfer fluid. In this example, the method also includes decreasing a temperature of the heated process fluid by performing a second heat transfer process between the post-expansion heat transfer fluid and the heated process fluid, wherein a temperature of the post-expansion heat transfer fluid is increased during the second heat transfer process and the latent heat that was supplied to the process fluid in the first heat transfer process is removed by the second heat transfer process, wherein the post-expansion heat transfer fluid exits the second heat transfer process as a gas that is supplied to a compressor.

Yet another illustrative method of processing a process fluid that comprises dissolved gas includes supplying the process fluid and a heat transfer fluid to a process fluid heat exchanger whereby, due to heat transfer between the process fluid and the heat transfer fluid, a temperature of the process fluid is increased and at least some of the dissolved gas within the process fluid is removed, the process fluid exiting the process fluid heat exchanger as a heated process fluid, and passing the heat transfer fluid that exits the process fluid heat exchanger though an expansion device so as to produce a post-expansion heat transfer fluid. In this example, the method also includes supplying the post-expansion heat transfer fluid and the heated process fluid to a heat recovery heat exchanger whereby, due to heat transfer between the post-expansion heat transfer fluid and the heated process fluid, a temperature of the heated process fluid is decreased and a temperature of the post-expansion heat transfer fluid is increased such that the post-expansion heat transfer fluid that entered the heat recovery heat exchanger exits the heat recovery heat exchanger as a heat transfer gas and the heated process fluid that entered the heat recovery heat exchanger exits the heat recovery heat exchanger as a cooled process fluid.

BRIEF DESCRIPTION OF THE DRAWINGS

The disclosure may be understood by reference to the following description taken in conjunction with the accompanying drawings, in which like reference numerals identify like elements, and in which.

Figure 1:
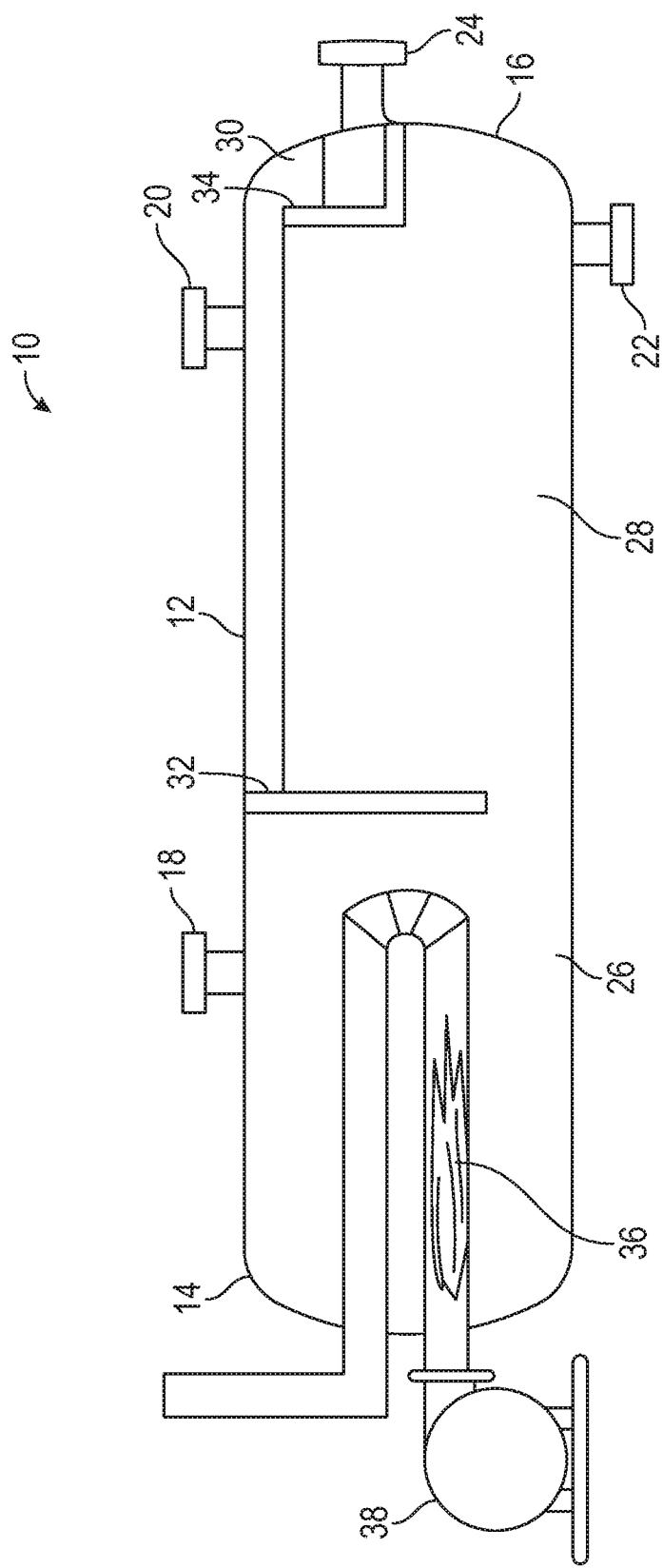
FIG. 1 depicts an example of a prior art heater-treater separation system.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention.

DETAILED DESCRIPTION

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In the following detailed description, various details may be set forth in order to provide a thorough understanding of the various exemplary embodiments disclosed herein. However, it will be clear to one skilled in the art that some illustrative embodiments of the invention may be practiced without some or all of such various disclosed details. Furthermore, features and/or processes that are well-known in the art may not be described in full detail so as not to unnecessarily obscure the disclosure of the present subject matter. In addition, like or identical reference numerals may be used to identify common or similar elements.

FIGS. 2-7 are various views of various illustrative examples of various novel embodiments of a system for degassing and/or separation of a fluid stream and methods of using such a system. As will be appreciated those skilled in the art after a complete reading of the present application, the presently disclosed subject matter may have many applications as it relates to the degassing and/or separation of a fluid stream. For purposes of disclosure only, one specific illustrative application will be discussed where the fluid stream is a hydrocarbon-containing process fluid. In this particular example, the systems and methods disclosed herein will be employed to degas and separate various liquids in the incoming hydrocarbon-containing fluid stream. Even more specifically, in the example described herein, the degassing and/or liquid separation system is used in a relatively low-pressure heater-treater separator vessel to separate at least some of the gas and/or water present in an incoming multiphase hydrocarbon-containing process fluid that enters the separator vessel. However, the presently disclosed invention should not be considered to be limited to this illustrative example or to the use in connection with only hydrocarbon-containing fluid streams. Lastly, the various inventions disclosed herein should not be considered to be limited to use in situations that involve both degassing and separation of liquids in a fluid stream as, depending upon the particular application, the methods and systems disclosed herein may be used for only degassing operations or for only liquid separation operations.

As noted above, the illustrative degassing and/or liquid separation system disclosed herein may be employed in one illustrative application wherein the degassing and/or liquid separation systems may be employed for separating water and/or light end hydrocarbons from oil in a multiphase hydrocarbon flow stream, i.e., a multiphase hydrocarbon-containing process fluid. Of course, the presently disclosed systems and methods may be employed to degas and/or separate liquids in any fluid stream, regardless of the composition of the fluid stream. In some applications, the methods and systems disclosed herein may be employed with fluid streams that are substantially free of hydrocarbon-containing fluids. Even in the case where the fluid stream that will be subjected to degassing and/or liquid separation process operations is a hydrocarbon-containing fluid, the methods and systems disclosed herein are not limited to situations where the hydrocarbon-containing process fluid is not a multiphase fluid, e.g., the hydrocarbon-containing process fluid may be all liquid.

Additionally, the degassing and/or liquid separation systems disclosed herein may be employed in a variety of separation applications as well as other applications wherein heating of a hydrocarbon-containing process fluid may be desired for any of a variety of reasons that are not related to separation of water and or gas from a multiphase stream that comprises oil. Therefore, the methods and systems disclosed herein should not be considered limited to only applications involving separation of water and/or gas from a multiphase hydrocarbon-containing process fluid. Moreover, in the case where the degassing and/or liquid separation systems disclosed herein may be employed in separation processes, the use of the degassing and/or liquid separation systems disclosed herein should not be considered to be limited to any particular hydrocarbon fractions which are treated by any such separation system. For example, a separation system that includes the novel degassing and/or liquid separation systems disclosed herein may be useful in separating water and/or light end hydrocarbons from oil in order to meet the custody transfer requirements for oil, for separating oil from water in order to meet the custody transfer requirements for water, and in separating gas from oil and water in order to meet the custody transfer requirements for gas. Further applications for use of the degassing and/or liquid separation systems disclosed herein as part of a separation system may be derived by persons of ordinary skill in the art from the teachings of the following disclosure.

In a general embodiment, in the illustrative context where the degassing and/or liquid separation systems disclosed herein is part of an overall separation system, the overall separation system may comprise an elongated separator vessel having a fluid inlet, a heating section which is located downstream of the fluid inlet, an oil accumulation section which is located downstream of the heating section, and a fluid (e.g., oil) outlet which is connected to the oil accumulation section. As described more fully below, the degassing and/or liquid separation system 300 disclosed herein may also include an immersed process fluid heat exchanger 320, a compressor 301, an expansion valve 304 and a heat-recovery heat exchanger 302. As will be appreciated by those skilled in the art after a complete reading of the present application, the immersed process fluid heat exchanger 320 may take a variety of forms, e.g., it may be an immersed plate type heat exchanger, a tube bundle type heat exchanger that comprises one or more tubes, etc. Thus, the immersed process fluid heat exchanger 320 should not be considered to be limited to the illustrative plate and frame heat exchanger disclosed herein. In one illustrative example, the immersed process fluid heat exchanger 320 is positioned in the heating section 118 of the vessel and other portions or components of the system 300 are in fluid communication with the immersed process fluid heat exchanger 320 as described more fully below. In use, the system 300 is a closed-loop system that heats a heat transfer fluid and circulates the heated heat transfer fluid through one side of the immersed process fluid heat exchanger 320 to thereby indirectly heat the hydrocarbon-containing process fluid on the other side of the immersed process fluid heat exchanger 320. One benefit of heating of the hydrocarbon-containing process fluid is that it lowers the viscosity of the hydrocarbon-containing process fluid and thereby facilitates gravity separation of the water from the oil. At the same time, heating the oil portion of the hydrocarbon-containing process fluid reduces the solubility of the light end hydrocarbons to thereby facilitate their transition from the liquid phase to the gas phase, thus reducing the volatility of the oil.

Figure 2:
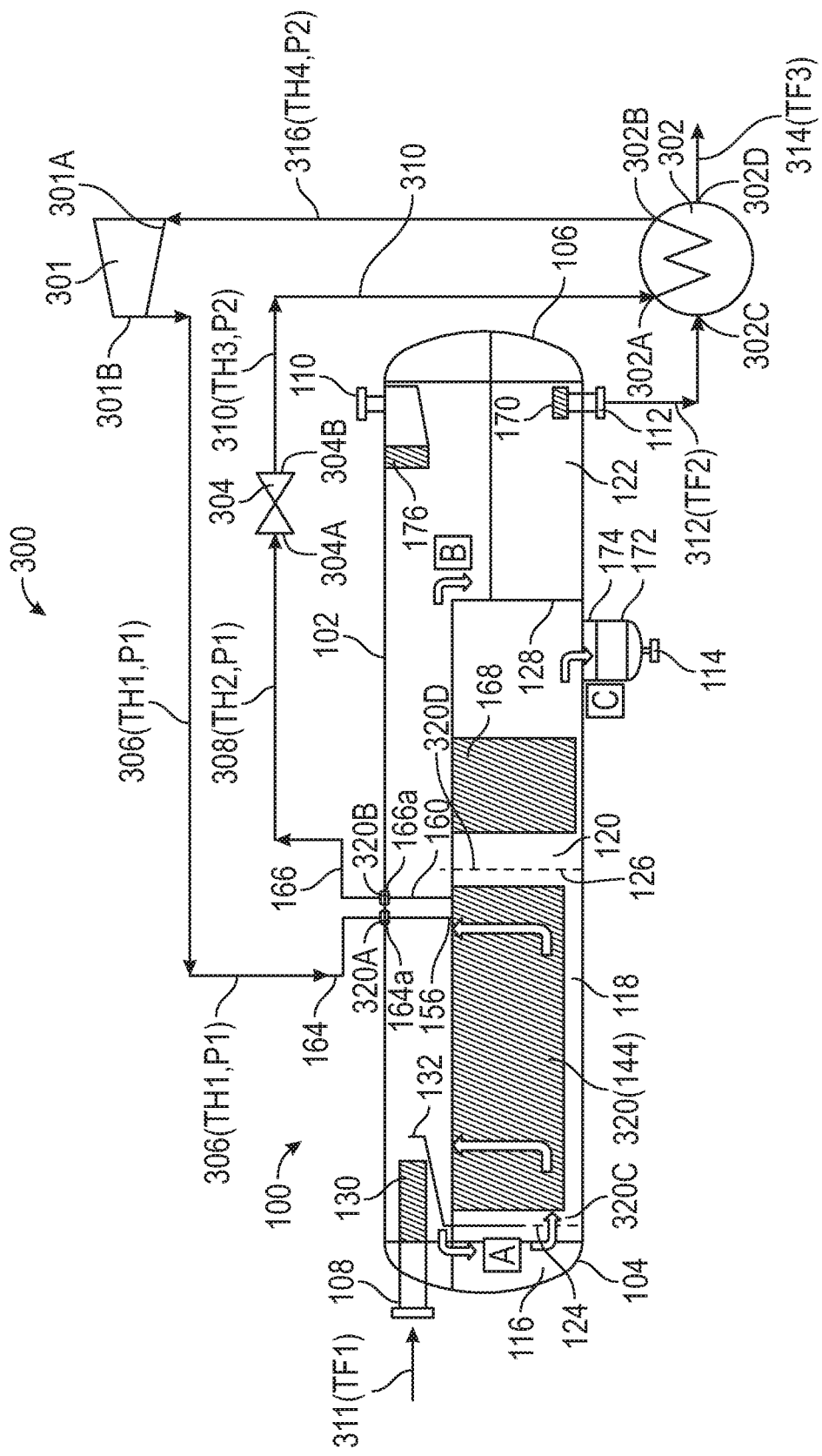
FIGS. 2-7 are various views of various illustrative examples of various novel embodiments of a system for degassing and/or separation of a fluid stream and methods of using same.

An illustrative embodiment of the system 300 disclosed herein in the context of its use in a specific application involving the separation of oil from gas and/or water present in a multiphase hydrocarbon-containing fluid is depicted in FIG. 2. The illustrative separation system, generally 100, includes an elongated, generally horizontally-oriented separator vessel 102 having an upstream end 104, a downstream end 106, a fluid inlet 108, a gas outlet 110, a liquid (e.g., oil) outlet 112 and a water outlet 114. The (multi-phase or single-phase) hydrocarbon-containing process fluid will enter the vessel 102 via the fluid inlet 108 where it will be subjected to the heating and separation processes described more fully below. The interior of the separator vessel 102 is segregated into one or more of an upstream section 116 which is located downstream of the fluid inlet 108, a heating section 118 which is located downstream of the upstream section 116, a separation section 120 which is located downstream of the heating section 118, and an oil accumulation section 122 which is located downstream of the separation section 120. The upstream section 116 is separated from the heating section 118 by one or more partially perforated baffle plates 124, the heating section 118 is separated from the separation section 120 by one or more fully perforated baffle plates 126, and the separation section 120 is separated from the oil accumulation section 122 by an overflow weir 128.

In the following discussion, it is assumed that the hydrocarbon-containing process fluid is a multi-phase fluid. In operation, a relatively low temperature multi-phase hydrocarbon-containing process fluid enters the separator vessel 102 through the fluid inlet 108. Immediately downstream of the fluid inlet 108, the hydrocarbon-containing process fluid may encounter an optional inlet device 130, which functions to disperse the flow stream to thereby facilitate bulk separation of the gas fraction from the oil/water fraction. The inlet device 130 may comprise, e.g., a flat impact plate, a dished impact plate, a half open pipe, an open pipe which is directed at the upstream end 104 of the separator vessel 102, a vane inlet device, or one or more inlet cyclones, all of which are conventional devices known to persons skilled in the art.

After exiting the inlet device 130, the low temperature oil/water fraction (and any solids, if present) within the hydrocarbon-containing process fluid is directed by an appropriate run-off plate 132 into the upstream section 116 of the separator vessel 102, as indicated by the arrow A, while the gas fraction exits the separation vessel 102 through the gas outlet 110. In the case where the inlet device 130 comprises one or more inlet cyclones, however, the run-off plate 132 may be eliminated since the liquid outlets of the inlet cyclones may be directly connected to the upstream section 116.

From the upstream section 116, the oil/water fraction of the hydrocarbon-containing process fluid flows through the partially perforated baffle plate 124 into the heating section 118 where it flows on the process fluid side of the illustrative immersed process fluid heat exchanger 320 where it is heated by indirect heat transfer with the heated heat transfer fluid flowing through the heat transfer side of the immersed process fluid heat exchanger 320. That is, the hydrocarbon-containing process fluid is in heat transfer communication with the heat transfer fluid. However, since the illustrative example of the system 300 disclosed herein is a closed loop system, the hydrocarbon-containing process fluid does not comingle with the heat transfer fluid flowing through the immersed process fluid heat exchanger 320.

Figure 3:
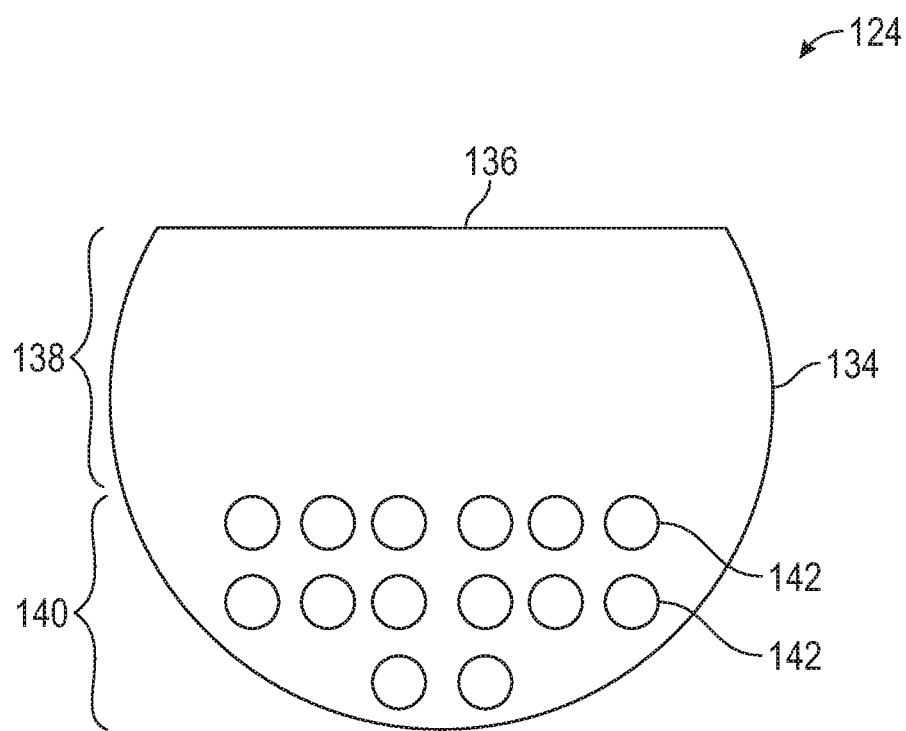

Referring to FIG. 3, the baffle plate 124 comprises a generally semicircular configuration having a curved peripheral edge 134 which conforms to the interior side and bottom surfaces of the separator vessel 102, and a straight top edge 136 which is located near and may optionally be connected to the lower edge of the run-off plate 132. The baffle plate 124 also includes a solid upper portion 138 and a perforated lower portion 140 which comprises a plurality of through holes 142. This design not only operates to even out the flow of the oil/water fraction, but it also ensures that the oil/water flow stream will enter the lower part of the heating section 118, which, as will be discussed below, will enhance the ability of the process fluid heat exchanger 320 to heat the oil/water flow stream in the heating section. Although only one partially perforated baffle plate 124 is shown in FIG. 2, two or more such baffle plates may be employed in different embodiments of the separation system of the present disclosure. In this case, the number of and spacing between the baffle plates 124 may be determined based on the requirements of a particular separation application.

In the heating section 118, the oil/water flow stream is heated by the immersed process fluid heat exchanger 320 which is submerged in the fluid in the heating section 118. As described more fully below, other portions of the system 300 are used to heat and evaporate a heat transfer fluid that will be circulated through the heat transfer fluid side of the immersed process fluid heat exchanger 320 so as to heat the hydrocarbon-containing process fluid. During this process, the latent heat in the gaseous thermal (heat transfer) fluid is released and transferred to the hydrocarbon-containing process fluid. The gaseous thermal (heat transfer) fluid partially or fully condenses during this process. Since the partially perforated baffle plate 124 forces the oil/water flow stream to enter the lower part of the heating section 118, the flow stream will flow both horizontally and vertically through the immersed process fluid heat exchanger 320 (e.g., the immersed plate heater 144 in the depicted example). This will prolong the exposure of the oil/water flow stream to the immersed process fluid heat exchanger 320 and thereby maximize the heating of the oil/water flow stream. As the oil/water flow stream is heated, the oil fraction will rise to the surface of the flow stream due to the effects of natural convection and buoyancy, while any light end hydrocarbon components of the oil will evaporate and exit the separator vessel 102 through the gas outlet 110.

As noted above, in one illustrative embodiment, the immersed process fluid heat exchanger 320 is the immersed plate heater 144. This embodiment of the immersed plate heater 144 generally includes one or more heat exchanger plates which each comprise a series of internal passages through which a heat transfer fluid (also called a thermal medium) flows. The heat exchanger plates may be constructed, for instance, by welding together two sheets of metal, at least one of which is die-formed to create the internal passages. In one embodiment, the immersed plate heater 144 may comprise a plurality of generally parallel, spaced-apart heat exchanger plates which are secured together by a frame member to thereby form an immersed plate heater bank. The heat exchanger plates may be oriented generally vertically in the heating section 118 generally parallel with the longitudinal axis of the separator vessel 102. Alternatively, the heat exchanger plates may be oriented at any angle and in any configuration which is determined to provide optimum heating for a given separation application.

The number, configuration, size, material, type (e.g., pillow or serpentine) and orientation of the heat exchanger plates, as well as the spacing between adjacent plates, may be determined for a particular separation application using, e.g., a conventional computational fluid dynamics program. Also, to ensure that any separated water fraction is not directly heated by the immersed plate heater and that any separated solids do not accumulate between the heat exchanger plates, the bottom of the heat exchanger plates is ideally spaced a certain distance from the bottom of the separator vessel 102, which distance may be determined based on the amount of water and solids that the oil/water fraction is expected to contain.

Figure 4:
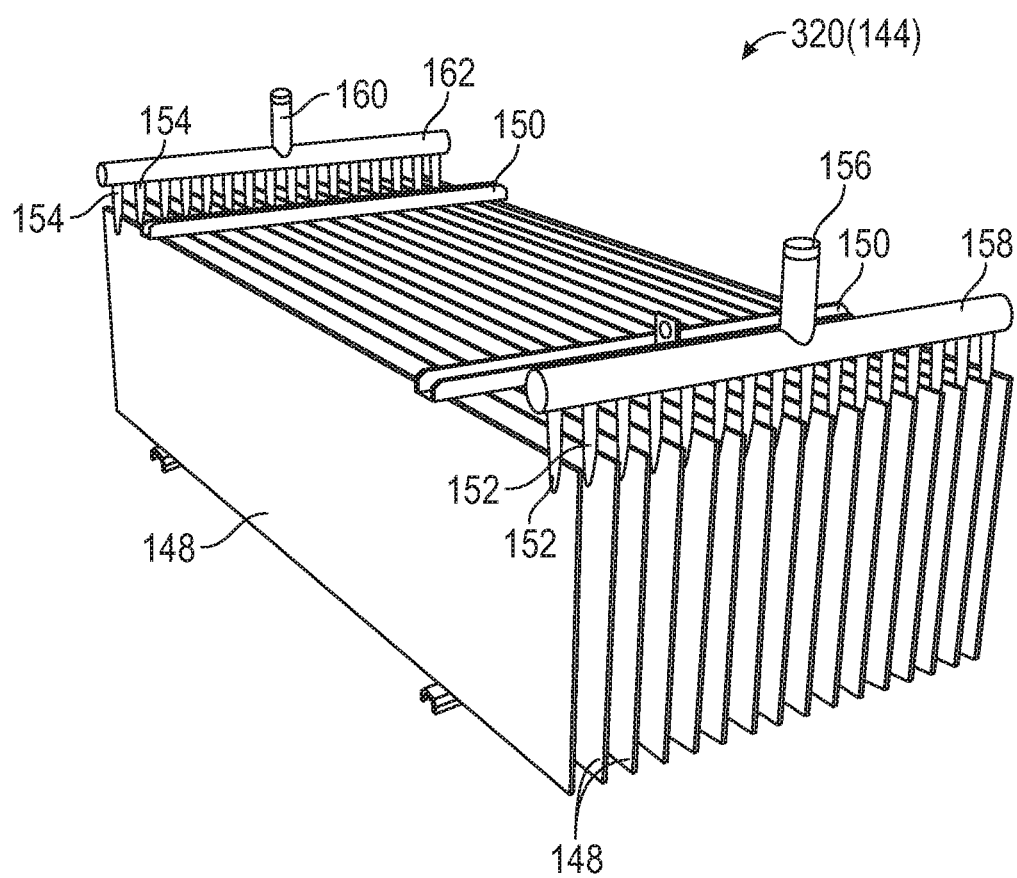

One example of an immersed plate heater 144 which is suitable for use as the process fluid heat exchanger 320 in the system 300 of the present disclosure is the immersed plate heater bank depicted in FIG. 4. This illustrative immersed plate heater bank 144, which is manufactured by Omega Thermo Products of Stratford, Wis., includes a plurality of generally rectangular heat exchanger plates 148 which are secured together in a generally vertical, generally parallel, spaced-apart manner by a pair of frame members 150. Each heat exchanger plate 148 comprises an inlet conduit 152 and an outlet conduit 154. The inlet conduits 152 are connected to a common inlet pipe 156 by an inlet manifold 158, and the outlet conduits 154 are connected to a common outlet pipe 160 by an outlet manifold 162.

In operation of the immersed plate heater bank 144, a heat transfer fluid which has been heated and evaporated by the system 300 (in a manner described more fully below) is conveyed through the inlet pipe 156 and the inlet manifold 158 into the inlet conduits 152 of the heat exchanger plates 148. From the inlet conduits 152, the heat transfer fluid flows through the internal passages of the heat exchanger plates 148 toward the outlet conduits 154. As the gaseous heat transfer fluid condenses, it will release its latent heat to the oil/water flow stream. The fully or partially condensed heat transfer fluid will then exit the heat exchanger plates 148 through the outlet conduits 154, the outlet manifold 162 and the outlet pipe 160 and return to the expansion valve 304.

Figure 7:
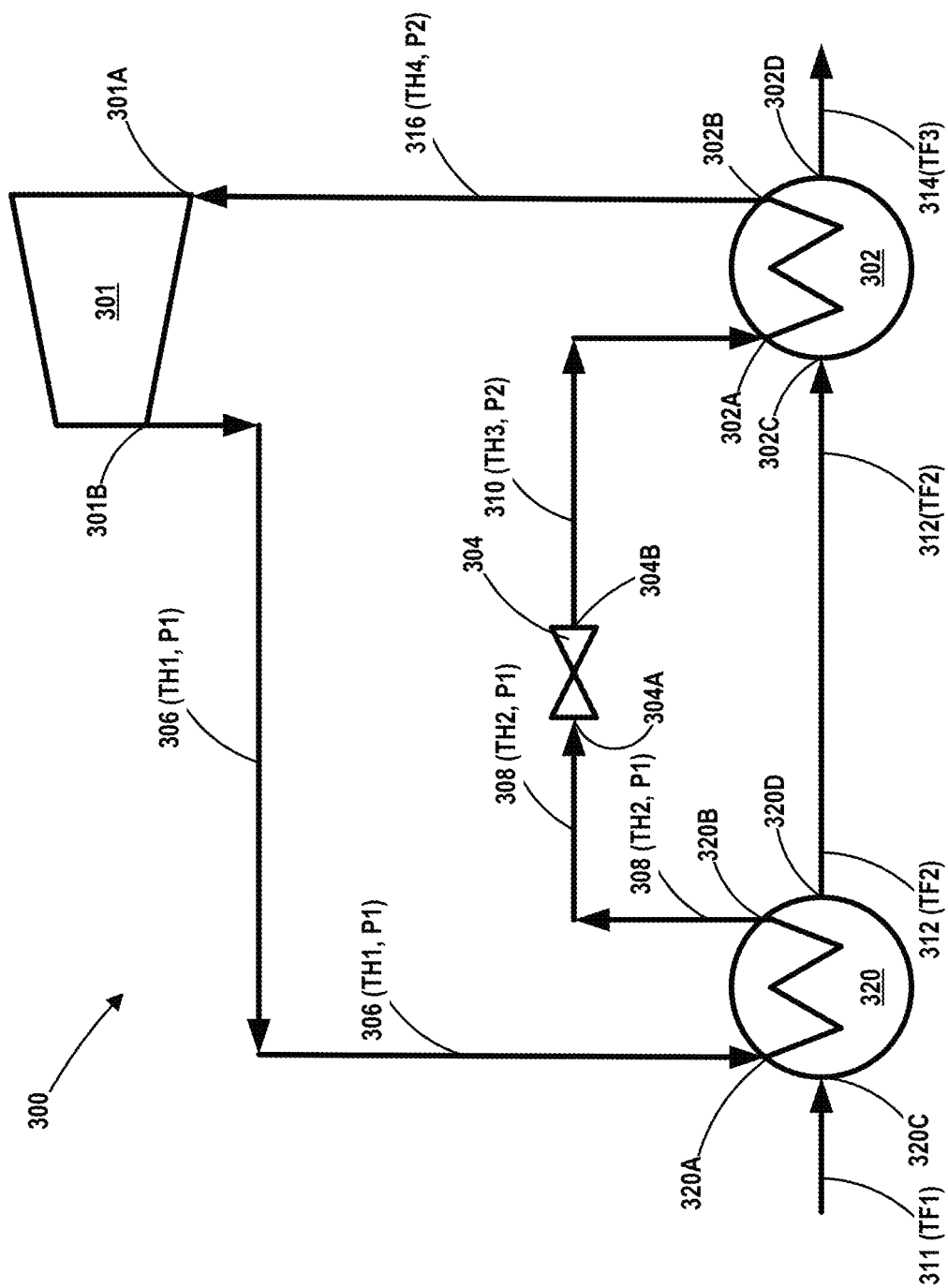

With reference to FIGS. 2 and 7, more specific aspects of one illustrative embodiment of a system 300 for heating a hydrocarbon-containing process fluid will now be discussed. In the example depicted above, the hydrocarbon-containing fluid is the oil/water fraction in the heating section 118 portion of the vessel 102. In one illustrative embodiment, the system 300 comprises a compressor 301, a heat-recovery heat exchanger 302, an expansion valve 304 and a process fluid heat exchanger 320 (which corresponds in this depicted example, to the immersed plate heater 144). These various components are connected by various sections of piping (not shown). In general, the system 300 is adapted to heat a heat transfer fluid that is directed to the process fluid heat exchanger 320 so as to heat the hydrocarbon-containing fluid to a desired temperature. As shown in FIG. 2, portions of the system 300 may be spaced apart from the separator vessel 102 and connected to the inlet and outlet pipes 156, 160 of the immersed plate heater 144 (i.e., the immersed process fluid heat exchanger 320) by corresponding inlet and outlet lines 164, 166, which are connected through the wall of the separator vessel by corresponding small, standard couplers 164a, 166a. The lines 164 and 156 are operatively coupled to one another by schematically depicted connectors 164A, e.g., a flanged connection. The lines 160 and 166 are operatively coupled to one another by schematically depicted connectors 166A, e.g., a flanged connection.

The compressor 301 comprises a low-pressure heat transfer fluid inlet 301A and a high-pressure heat transfer fluid outlet 301B. The expansion valve 304 comprises a heat transfer fluid inlet 304A and a heat transfer fluid outlet 304B. The process fluid heat exchanger 320 comprises a heat transfer fluid inlet 320A, a heat transfer fluid outlet 320B, a process fluid inlet 320C and a process fluid outlet 320D. The heat-recovery heat exchanger 302 comprises a heat transfer fluid inlet 302A, a heat transfer fluid outlet 302B, a heated process fluid inlet 302C and a cooled process fluid outlet 302D.

The compressor 301 may be of any type or form. Similarly, the expansion valve 304 may be any type of valve sufficient to create a pressure drop in the heat transfer fluid as the heat transfer fluid flows through the expansion valve 304. The heat-recovery heat exchanger 302 and process fluid heat exchanger 320 may be of any type or form, e.g., immersed plate heat exchangers, tube bundle type heat exchangers, shell-and-tube heat exchangers, etc. Of course, the heat-recovery heat exchanger 302 and process fluid heat exchanger 320 need not both be the same type of heat exchanger, although that may be the case in some applications. Any heat transfer fluid may be used as the heat transfer fluid, e.g., R134a, steam/water, ammonia, propane, butane, etc., that has appropriate boiling points and dew points for the intended temperatures and pressures of the system.

As noted above, and with reference to FIG. 7, the immersed process fluid heat exchanger 320 will be used to increase the temperature of a hydrocarbon-containing process fluid (i.e., the process fluid) as it passes through the immersed process fluid heat exchanger 320. Here the latent heat from changing the heating medium from gaseous phase to liquid phase is the driving force for heating the process fluid. The heat-recovery heat exchanger 302 will be used to evaporate the heat transfer fluid once more, thus recharging it with latent heat while also superheating the heat transfer fluid after the heat transfer fluid has passed through the immersed process fluid heat exchanger 320 and the expansion valve 304 before heat transfer fluid enters the compressor 301. The superheating of the gas as it exits the heat-recovery heat exchanger 302 is required to ensure no liquid will go into the compressor 301, which would otherwise result in mechanical damage to the compressor 301. More specifically, the hydrocarbon-containing process fluid 311 has an inlet temperature TF1 at the process fluid inlet 320C of the immersed process fluid heat exchanger 320 while the heated hydrocarbon-containing process fluid 312 exiting the process fluid outlet 320D of the immersed process fluid heat exchanger 320 has an exit temperature TF2, wherein the temperature TF2 is greater than the temperature TF1. The heated hydrocarbon-containing process fluid 312 (at temperature T2) that exits the immersed process fluid heat exchanger 320 will be introduced into the heat transfer fluid inlet 302C of the heat-recovery heat exchanger 302 where it will be cooled such that the cooled hydrocarbon-containing process fluid 314 exiting the cooled process fluid outlet 302D of the heat-recovery heat exchanger 302 will have an exit temperature TF3 that is less than the temperature TF2. In one illustrative example, the pressure of the hydrocarbon-containing process fluid as it flows through the immersed process fluid heat exchanger 320 and the heat-recovery heat exchanger 302 may be substantially constant (except for nominal pressure loss associated with fluids flowing through lines, etc.). In one illustrative example, the heat transfer fluid 308 that exits the process fluid heat exchanger 320 is at a second temperature (TH2) that is at least equal to or less than a dew point temperature of the heat transfer fluid 308 at a discharge pressure of the compressor 301. In another illustrative embodiment, the heat transfer fluid that exits the discharge of the compressor at a compressor discharge pressure has a dew point that is above the desired heated process fluid temperature and a boiling point that is below the desired heated process fluid temperature at a pressure of the compressor inlet.

With continuing reference to FIG. 7, and with respect to the heat transfer fluid side of the system 300, the heat transfer fluid 306 exiting the high-pressure heat transfer fluid outlet 301B of the compressor 301 will be a high-temperature, high-pressure gas at a temperature TH1 and a pressure P1. The high-temperature, high-pressure heat transfer fluid 306 flows into the heat transfer fluid inlet 320A of the process fluid heat exchanger 320. The heat transfer fluid 308 exiting the heat transfer fluid outlet 320B will be primarily liquid. As the high-temperature, high-pressure heat transfer fluid 306 (i.e., gas) flows through the immersed process fluid heat exchanger 320, its temperature will decrease to its dew point after which latent heat is extracted as it transfers its heat to the hydrocarbon-containing process fluid 312 flowing through process fluid side of the immersed process fluid heat exchanger 320. As a result of the decrease of the temperature of the heat transfer fluid 306, it will undergo a condensation process such that the heat transfer fluid 308 leaving the outlet 320D of the immersed process fluid heat exchanger 320 will typically have a high liquid-to-gas ratio by mass, e.g., 90-100% liquid. That is, the heat transfer fluid 308 is primarily a low-temperature, high-pressure liquid with a temperature TH2 that is significantly less than the temperature TH1, while the pressure of the heat transfer fluid 308 will be substantially the same as pressure P1 (except for line losses). The dew point (temperature at which the condensation process starts) lies in between TH1 and TH2. In some cases, all of the heat transfer fluid may be converted into liquid and the liquid temperature may be supercooled.

At the heat transfer fluid inlet 304A of the expansion valve 304, the heat transfer fluid 308 has the aforementioned temperature TH2 and the aforementioned pressure P1. The heat transfer fluid 310 exiting the heat transfer fluid outlet 304B of the expansion valve 304 has a temperature TH3 and a pressure P2, wherein the temperature TH3 may be less than the temperature TH2 and wherein the pressure P2 is significantly less than the pressure P1. Typically the liquid at TH2 and P1 is not supercooled. In this case, due to the significant pressure drop across the expansion valve 304, as the heat transfer fluid goes through the expansion valve 304, it will significantly decrease in pressure and temperature through the expansion process as a certain amount of the liquid in the entering heat transfer fluid 308 coverts to a gas. If the liquid is supercooled by a big enough margin, the pressure drop across the expansion valve does not lead to gas formation and the depressurization process is isothermal. In most cases, the heat transfer fluid 310 exiting the expansion valve 304 may contain a significant mass fraction of gas, e.g., about 10% to 50% gas.

The heat transfer fluid 310, with the aforementioned temperature TH3 and the aforementioned pressure P2, is introduced into the heat transfer fluid inlet 302A of the heat-recovery heat exchanger 302. The heat transfer fluid 316 exiting the heat transfer fluid outlet 302B of the heat-recovery heat exchanger 302 has a temperature TH4, while the heat transfer fluid 316 has a pressure that is substantially the same as the pressure P2 (except for line losses) as that of the heat transfer fluid 310. Within the heat-recovery heat exchanger 302, the higher temperature heated hydrocarbon-containing process fluid 312 at temperature TF2 will transfer heat into the heat transfer fluid 310. Thus, thermal heat is harvested from the process fluid 312 and converted into latent heat by converting liquid in the heat transfer fluid 310 to gas. Ultimately, due to the heat transfer between the heated hydrocarbon-containing process fluid 312 and the heat transfer fluid 310, the heat transfer fluid 316 exiting the heat transfer fluid outlet 302B of the heat recovery heat exchanger 302 is substantially all gas. The heat transfer fluid 316 is at a temperature TH4 that is greater than TH3 and is at approximately the same pressure P2 as that of the heat transfer fluid 310 that entered the heat recovery heat exchanger 302. In most applications, the temperature TH3 may be selected so as to superheat the heat transfer fluid 316 (i.e., gas) so as to insure that essentially no liquids flow into the compressor 301. As depicted, the heat transfer fluid 316 flows into low-pressure heat transfer fluid inlet 301A to the compressor 301 where it is then compressed so as to have the temperature and pressure conditions of the high-pressure, high-temperature heat transfer fluid 306 when it exits the high-pressure heat transfer fluid outlet 301B of the compressor 301. This allows the latent heat that was harvested through the heat transfer in the recovery heat exchanger 302 to be released through the immersed process fluid heat exchanger 320.

One specific illustrative application of the system 300 disclosed herein will be discussed in the context wherein the system 300 is used in a relatively low-pressure heater-treater separator vessel 102 to separate at least some of the gas and water present in an incoming hydrocarbon-containing process fluid that enters the vessel 102 via the fluid inlet 108. In this example, the heat transfer fluid may be R134a.

The incoming hydrocarbon-containing process fluid typically comprises gas and liquid (e.g., oil and/or water) and perhaps some solid particulate matter. In one illustrative example, the system 300 disclosed herein may be employed to heat a stream of hydrocarbon-containing process fluid that is produced from an oil and gas well (not shown). The hydrocarbon-containing process fluid supplied to the illustrative vessel 102 depicted herein may have been subjected to previous processing operations (e.g., separation processes) in one or more items of processing equipment (not shown) positioned upstream of the vessel 102 prior to being introduced in the vessel 102. The gas-liquid ratio as well as the oil-water ratio of the hydrocarbon-containing process fluid that enters the vessel 102 at the fluid inlet 108 may vary depending upon the particular application, e.g., in some cases, the incoming hydrocarbon-containing process fluid may be substantially all liquid, or it may have a relatively large mass gas fraction with a relatively small liquid mass fraction, or it may be a mixture of gas and liquid. In one particular example, the hydrocarbon-containing process fluid 311 that enters the vessel may have a vapor mass fraction of about 3%.

The conditions of the process fluid 311 that enters the fluid inlet 108 and ultimately enters the process fluid side of the process fluid heat exchanger 320 has a temperature TF1 that may vary depending upon the particular application. In one particular embodiment, the temperature TF1 may range from about 35-100° F. depending upon the particular application. Similarly, the pressure of the process fluid 311 at the fluid inlet 108 may vary, e.g., about 5-50 psi. In one illustrative application, the temperature TF2 of heated hydrocarbon-containing process fluid 312 as it leaves the fluid exit 112 of the vessel 102 may be about 135° F. while the temperature TF3 of the cooled hydrocarbon-containing process fluid 314 leaving the outlet 302D of the heat-recovery heat exchanger 302 may be about 5-10° F. less than the temperature TF1 of the incoming process fluid 311 depending upon the choice of heat transfer fluid and the pressure P2. For example, in the case where the temperature TF1 of the incoming hydrocarbon-containing process fluid 311 is about 45° F., the temperature TF3 of the cooled hydrocarbon-containing process fluid 314 may be about 35° F. In one application, the pressure of the hydrocarbon-containing process fluid as it flows through the vessel 102 and the heat-recovery heat exchanger 302 may be substantially constant (except for nominal line losses, etc.)

In this illustrative example, the heat transfer fluid 306 leaves the high-pressure heat transfer fluid outlet 301B of the compressor 301 as a high-temperature, high pressure gas with a temperature TH1 and a pressure P1. In one illustrative example, the temperature TH1 may be approximately 294° F. and the pressure P1 may be about 290 psia. The high-temperature, high-pressure heat transfer fluid 306 enters the heat transfer fluid inlet 320A of the immersed process fluid heat exchanger 320 and flows out of the heat transfer fluid outlet 320B of the immersed process fluid heat exchanger 320. As the heat transfer fluid flows through the immersed process fluid heat exchanger 320, its temperature initially decreases as it transfers its heat to the hydrocarbon-containing process fluid flowing through the process fluid side of the process fluid heat exchanger 320 until the heat transfer fluid reaches the dew point. At this point, the heat transfer from the heat transfer fluid to the hydrocarbon-containing process fluid continues as the latent heat is transferred from the heat transfer fluid to the process fluid as the heat transfer fluid condenses. The heat transfer fluid 308 leaving the heat transfer fluid outlet 320B of the immersed process fluid heat exchanger 320 may have a substantially high liquid-to-gas ratio, e.g., it may be in the range of about 85-100% liquid by mass. The heat transfer fluid 308 has a temperature TH2 and it remains at about the pressure P1, i.e., there is little pressure drop as the heat transfer fluid flows through the process fluid heat exchanger 320. The temperature TH2 may be significantly less than the temperature TH1, e.g., TH2 may be at least about 7° F. above the temperature TF1 of the hydrocarbon-containing process fluid 311 that enters the system. In one illustrative example, the temperature TH2 may be approximately 47° F. and the pressure P1 may be about 290 psia. The pressure P1 of the heat transfer fluid 308 is typically selected such that the heat transfer fluid 306 condenses at a temperature that is about 7-20° F. (5-11° C.) greater than the desired temperature TF2 of the heated hydrocarbon-containing process fluid 312 as it exits the immersed process fluid heat exchanger 320. As will be appreciated by those skilled in the art after a complete reading of the present application, the smaller this temperature difference, the greater the efficiency of the system, but the larger the required surface area of the process fluid heat exchanger 320 needs to be to perform the needed heat transfer. The condensation of the heat transfer fluid—from a vapor to a stream that has a very high liquid concentration—as it passes through the immersed process fluid heat exchanger 320 is a substantially isobaric process.

The high liquid content heat transfer fluid 308, at the temperature TH2 and the pressure P1, enters the heat transfer fluid inlet 304A of the expansion valve 304 where it undergoes an expansion process as the pressure of the heat transfer fluid is greatly decreased as it passes through the expansion valve 304. The reduction in pressure results in a certain portion of the liquid in the heat transfer fluid 308 to convert from a liquid to a gas. In one illustrative embodiment, the heat transfer fluid 310 leaving the heat transfer fluid outlet 304B of the expansion valve 304 has a stream comprised of primarily gas, e.g., at least about 90% gas (by volume (about 10% by mass). In one illustrative embodiment, the heat transfer fluid 310 leaving the expansion valve 304 may be at the temperature TH3 and at a pressure P2, wherein the pressure P2 is substantially less (e.g., about 250 psia less than the pressure P1 of the process fluid 308 as it enters the expansion valve 304. In another embodiment, the pressure P1 is such that the dew point of the heat transfer fluid 310 is above the desired temperature (TH2) of the heated process fluid and the pressure P2 is such that the boiling point of the heat transfer fluid 310 is below the desired temperature (TH2) of the heated process fluid. In one example, the temperature TH3 of the heat transfer fluid 310 may be somewhat less than the temperature TH2 of the heat transfer fluid 308 that enters the expansion valve 304, e.g., the temperature TH3 may be approximately 20° F., i.e., the heat transfer fluid may experience a temperature drop of only about 10-20° F. across the expansion valve. In one illustrative example, the pressure P2 of the heat transfer fluid 310 may be about 30 psia, i.e., the heat transfer fluid may experience a pressure drop of about 260 psia across the expansion valve 304.

The heat transfer fluid 310 enters the heat transfer fluid inlet 302A of the heat-recovery heat exchanger 302 and flows out of the heat transfer fluid outlet 302B of the heat-recovery heat exchanger 302. As the heat transfer fluid 310 flows through the heat-recovery heat exchanger 302, the liquid portion of the heat transfer fluid 310 is evaporated as it absorbs heat from the higher-temperature heated hydrocarbon-containing process fluid stream 312 flowing through the process fluid side of the heat-recovery heat exchanger 302. After all the liquid is evaporated from the heat transfer fluid 310, the temperature increases to at least 35° F. above the boiling point to ensure no liquid will enter the inlet or suction of the compressor 301. Accordingly, the heat transfer fluid stream 316 leaving the heat-recovery heat exchanger 302 has a temperature TH4 and a pressure P2. In general, the heat transfer fluid 316 leaving the heat transfer fluid outlet 302B of the heat-recovery heat exchanger 302 may be comprised of substantially only superheated gas so it may later be compressed within the compressor 301. In one illustrative example, the temperature TH4 of the heat transfer fluid 316 may be about 107° F., while the pressure P2 of the heat transfer fluid 316 may remain about the same as the pressure of the heat transfer fluid 310 when it entered the heat-recovery heat exchanger 302, e.g., about 30 psia.

At that point, the heat transfer fluid 316 enters the low-pressure heat transfer fluid inlet 301A of the compressor 301. The compressor 301 is operated so as to compress the heat transfer fluid 316 so as to thereby increase its temperature and pressure until such time as the compressed gas exits the high-pressure heat transfer fluid outlet 310B as the high-temperature, high-pressure heat transfer fluid stream 306 discussed above.

As will be appreciated by those skilled in the art after a complete reading of the present application, by controlling the pressure P2 of the heat transfer fluid 310 that exits the expansion device 304, certain heat transfer aspects of the system 300 may be controlled. The boiling/condensation point, i.e., the temperature, of the heat transfer fluid 310 depends on the pressure P2 of the heat transfer fluid 310. Thus, by setting the pressure P2 at the appropriate value, the boiling point of the heat transfer fluid 310 will be low enough to insure that the hot process fluid 312 that enters the heat recovery heat exchanger 302 is able to boil substantially all of the heat transfer fluid 310 as the heat transfer fluid 310 passes through the heat recovery heat exchanger 302 thereby charging the heat transfer fluid 310 with latent heat that ultimately exits the heat recovery heat exchanger 302 as a relatively higher temperature gas stream 316 at temperature TH4. Then, the compressor 301 brings the heat transfer fluid to a pressure designed such that the heat transfer fluid stream 306 that exits the compressor has a boiling point (or dew point) that is above the desired temperature of the hot process fluid 312 that exits the immersed process fluid heat exchanger 320. As noted above, the heat transfer fluid that enters the immersed process fluid heat exchanger 320 is a high temperature gas and condenses as it passes through the immersed process fluid heat exchanger 320 where it exits as a primarily cooled liquid. Thus, the latent heat in the heat transfer fluid is effectively rereleased from the heat transfer fluid so as to heat up the process fluid flowing through the immersed process fluid heat exchanger 320.

Figure 5:
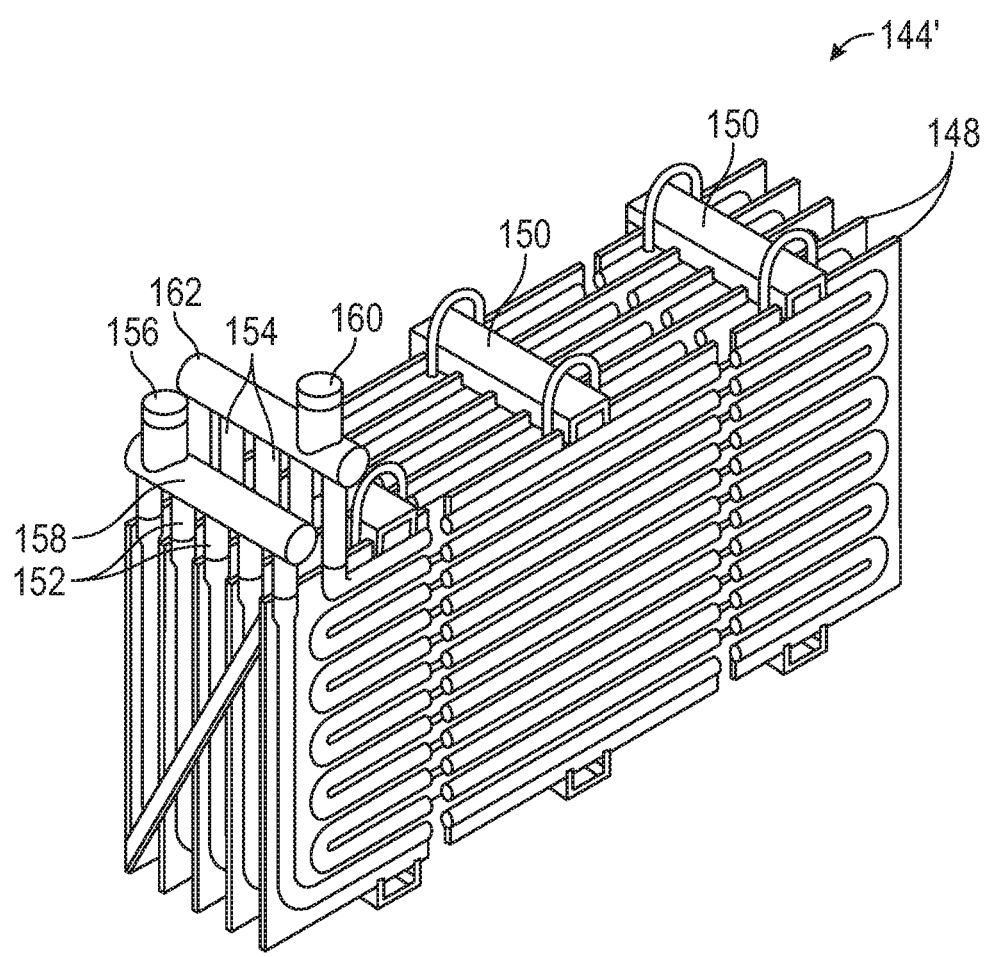

In the illustrative example wherein the immersed process fluid heat exchanger 320 is an immersed plate heater, the internal fluid passages of the heat exchanger plates 148 may be configured to provide optimal heat exchange for a given separation application. Referring to FIG. 5, for example, which depicts a Style 50 Platecoil® immersed plate heater bank 144' manufactured by Tranter, Inc. of Wichita Falls, Tex., the internal passage of each heat exchanger plate 148 comprises a serpentine configuration from the inlet conduit 152 to the outlet conduit 154. As with the immersed plate heater 144 depicted in FIG. 4, the heat exchanger plates 148 of the immersed plate heater bank 144' are generally rectangular, are oriented generally vertically and are held together in a generally parallel, spaced-apart relationship by a number of frame members 150. In addition, each heat exchanger plate 148 includes an inlet conduit 152 which is connected to a common inlet pipe 156 by an inlet header 158 and an outlet conduit 154 which is connected to a common outlet pipe 160 by an outlet header 162.

Upon exiting the heating section 118, the oil/water flow stream flows through the perforated baffle plate 126, which functions to evenly distribute the flow stream throughout the cross section of the separation section 120. This will optimize the gravity separation of not only the water fraction (and any solids, if present) from the oil fraction, but also the relatively hot oil from the relatively cold oil. Although only one perforated baffle plate 126 is shown in FIG. 2, two or more such baffle plates may be employed in different embodiments of the separation system of the present disclosure. In this case, the number of and spacing between the baffle plates 126 may be determined based on the requirements of a particular separation application.

If desired or required for a particular separation application, the separation section 120 may include a conventional plate pack coalescer 168 or similar device for increasing the size of the dispersed oil and water droplets to thereby increase the settling rate of the oil and water fractions. The plate pack coalescer 168 comprises a plurality of parallel plates which are oriented at fixed angles relative to the horizontal mid-plane of the separator vessel 102. Due to the fact that the distance between the plate surfaces is small, the dispersed oil and water droplets need only travel a short distance until they reach the oil/water interface. Thus, substantial separation of the oil and water fractions can be effectively achieved over the relatively short length of the plate pack coalescer 168. Furthermore, since the flow between the plates lies in the laminar regime, turbulent eddies which would otherwise negatively affect gravity separation of the droplets are eliminated. A suitable plate pack coalescer for use in the separation system 100 of the present disclosure is available from TechnipFMC of Houston, Tex.

As the oil/water flow stream progresses through the separation section 120, the water fraction will separate from the oil fraction and settle to the bottom of the separator vessel 102. At the downstream end of the separation section 120, the relatively high temperature oil will flow over the overflow weir 128 and into the oil accumulation section 122, as indicated by the arrow B in FIG. 2. The overflow weir 128 is designed such that only the upper portion of the flow stream, which is occupied by the relatively high temperature oil, will flow into the oil accumulation section 122 and that the water and the relatively cold oil fractions will remain within the separation section 120. The overflow weir 128 also ensures that the immersed plate heater 144 will remain fully submerged in the oil/water flow stream.

From the oil accumulation section 122, the oil fraction exits the separator vessel 102 through the oil outlet 112. If desired, a conventional vortex breaker 170 may be provided on the oil outlet 112 to prevent the formation of vortexes in the oil, which may induce gas carry-under. From there, the heated oil fraction 312 at temperature TF2 enters the heat recovery heat exchanger 302 as discussed above.

From the separation section 120, the water fraction exits the separator vessel 102 through the water outlet 114, as indicated by the arrow C in FIG. 2. In separation applications in which the water component of the oil/water fraction is low (e.g., 1% of the oil/water fraction), a conventional liquid boot 172 may be positioned between the separator vessel and the water outlet 114 to facilitate measurement of the oil/water interface by certain sensors (such as guided wave radar sensors). Also, a conventional vortex breaker 174 may be provided upstream of the liquid boot 172 or on the water outlet 114 to prevent the formation of vortexes in the water, which may induce oil carry-under.

The light end hydrocarbons which have separated from the oil/water fraction during the various stages of the separation process exit the separator vessel 102 through the gas outlet 110. If required, a conventional demisting device 176 may be provided upstream of the gas outlet 110 to separate any liquid (i.e., oil or water) droplets from the gas before it exits the separator vessel 102. The demisting device 176 may comprise, but is not limited to, a mesh type demister, a vane type demister and a cyclone type demister, such as the SpiraFlow™ cyclone manufactured by TechnipFMC of Houston, Tex.

Figure 6:
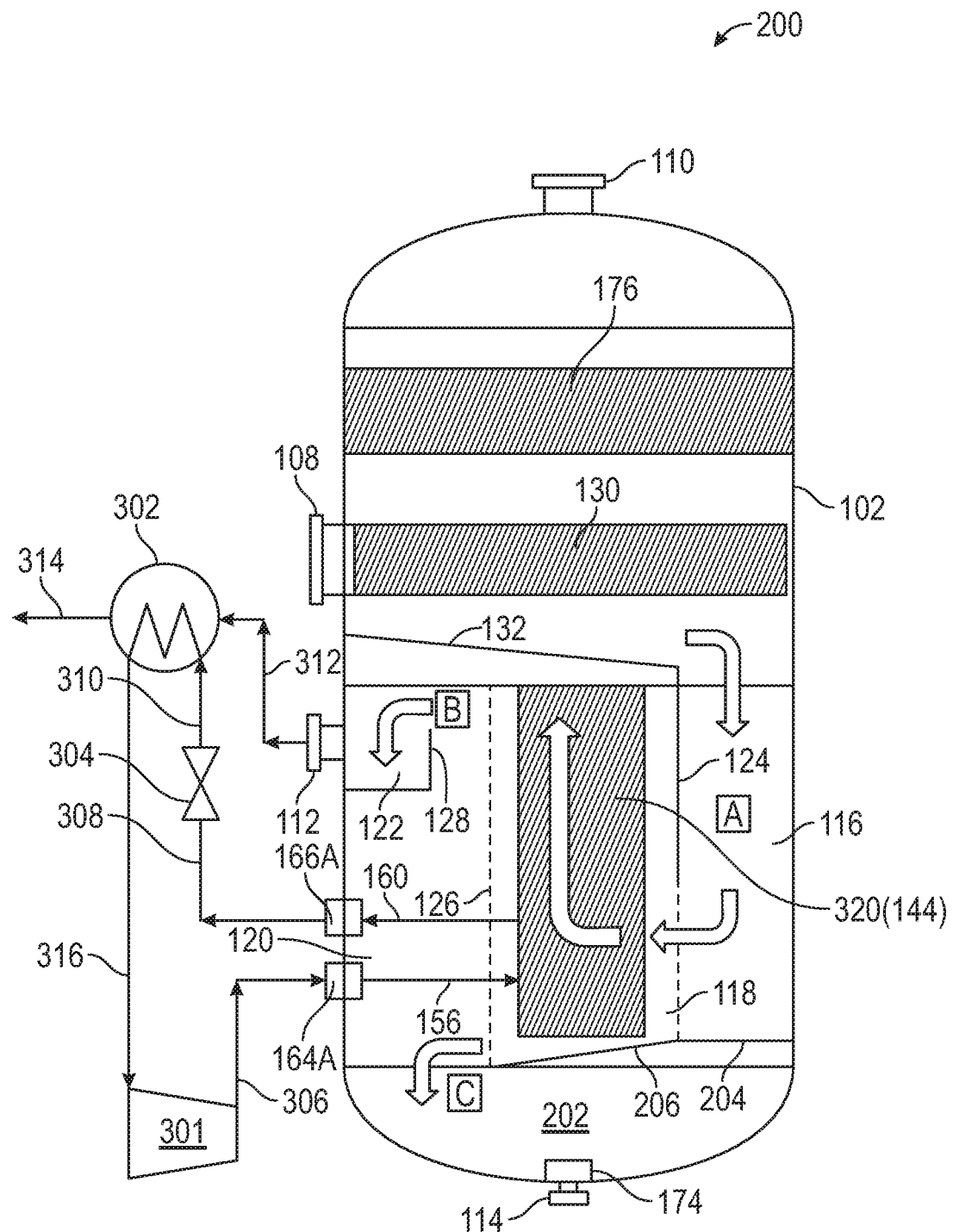

A second illustrative embodiment of the separation system of the present disclosure is shown in FIG. 6. The separation system of this embodiment, generally 200, is similar in many respects to the separation system 100 described above. Therefore, the same reference numbers will be used to designate similar components. In contrast to the separation system 100, however, the elongated separator vessel 102 of the separation system 200 is oriented generally vertically. Such an orientation may be preferred, for example, in installations where space is limited or in applications where the hydrocarbon flow stream has a relatively high gas-to-liquid ratio.

Similar to the separation system 100, the separator vessel 102 of the separation system 200 includes an inlet 108, an upstream section 116 which is located downstream of the inlet, a heating section 118 which is located downstream of the upstream section, a separation section 120 which is located downstream of the heating section, and an oil accumulation section 122 which is located downstream of the separation section. The upstream section 116 is separated from the heating section 118 by one or more partially perforated baffle plates 124, the heating section 118 is separated from the separation section 120 by one or more fully perforated baffle plates 126, and the separation section 120 is separated from the oil accumulation section 122 by an overflow weir 128. In this embodiment, the upstream section 116 and the heating section 118 are spaced vertically above the bottom of the separator vessel 102, a lateral portion 202 of the separation section 120 extends beneath these sections, and the upstream section 116 and the heating section 118 are separated from this lateral portion by a corresponding bottom plate 204, 206. The above-described system 300 is also depicted in FIG. 6.

In operation, the relatively low temperature hydrocarbon flow stream enters the separator vessel 102 through the inlet 108. Immediately downstream of the inlet 108, the hydrocarbon flow stream may encounter an optional inlet device 130, which as described above functions to disperse the flow stream to thereby facilitate bulk separation of gas from the hydrocarbon flow stream. After exiting the inlet device 130, the flow stream is directed by an appropriate run-off plate 132 into the upstream section 116 of the separator vessel 102, as indicated by the arrow A, while the gas rises and exits the separator vessel 102 through a gas outlet 110. As with the separation system 100, in the case where the inlet device 130 comprises one or more inlet cyclones, the run-off plate 132 may be eliminated since the liquid outlets of the inlet cyclones may be directly connected to the upstream section 116.

From the upstream section 116, the oil/water fraction flows through the partially perforated baffle plate 124 into the heating section 118. As described above, the partially perforated baffle plate 124 functions to even out the oil/water flow stream and ensure that the flow stream enters the lower part of the heating section 118. Although only one partially perforated baffle plate 124 is shown in FIG. 6, two or more such baffle plates may be employed depending on the requirements of a particular separation application.

In the heating section 118, the oil/water flow stream is heated by the above-described immersed process fluid heat exchanger 320 (e.g., an immersed plate heater 144 in the depicted example). As described above, the immersed plate heater 144 is connected to the remaining components of the heat transfer system 300 as described above that are positioned externally of the separator vessel 102. As the oil/water flow stream is heated, the oil fraction will rise to the surface of the flow stream due to the effects of natural convection and buoyancy, while the light end hydrocarbon components of the oil will evaporate and exit the separator vessel 102 through the gas outlet 110. In this regard, the run-off plate 132 may be fitted with a conventional goose neck vent (not shown) to prevent the gas from being trapped below the run-off plate.

Upon exiting the heating section 118, the oil/water flow stream flows through the perforated baffle plate 126, which functions to evenly distribute the flow stream and thereby optimize the gravity separation of the water fraction from the oil fraction and also the relatively hot oil from the relatively cold oil. Although only one perforated baffle plate 126 is shown in FIG. 6, two or more such baffle plates may be employed depending on the requirements of a particular separation application.

As the oil/water flow stream exits the heating section 118 and progresses through the separation section 120, the water fraction will separate from the oil fraction, settle to the bottom of the separator vessel 102 (as indicated by the arrow C), and exit the separator vessel through the water outlet 114 (which may include an optional vortex breaker 174). At the same time, the relatively high temperature oil, i.e., the heated hydrocarbon-containing process fluid 312, will rise toward the top of the separation section 120, flow over the overflow weir 128 into the oil accumulation section 122 (as indicated by the arrow B), and exit the separator vessel 102 through the oil outlet 112. At that point, the heated hydrocarbon-containing process fluid 312 will flow into the heat recovery heat exchanger 302. As discussed above, the overflow weir 128 is designed to ensure that the water and relatively cold oil will remain in the separation section 120 and that the immersed plate heater 144 will remain fully submerged in the oil/water flow stream.

The light end hydrocarbons which have separated from the oil/water fraction during the various stages of the separation process will exit the separator vessel 102 through the gas outlet 110. If required, a conventional demisting device 176 may be provided upstream of the gas outlet 110 to separate any liquid (i.e., oil or water) droplets from the gas before it exits the separator vessel 102.

The particular embodiments disclosed above are illustrative only, as the invention may be modified and practiced in different but equivalent manners apparent to those skilled in the art having the benefit of the teachings herein. For example, the method steps set forth above may be performed in a different order. Furthermore, no limitations are intended to the details of construction or design herein shown. It is therefore evident that the particular embodiments disclosed above may be altered or modified and all such variations are considered within the scope and spirit of the invention. Accordingly, the protection sought herein is as set forth in the claims below.

What is claimed:

1. A system, comprising:
    a compressor that comprises an inlet and an outlet;
    a process fluid heat exchanger that is in fluid communication with the compressor outlet, wherein the process fluid heat exchanger is adapted to receive a heat transfer fluid from the compressor outlet and a process fluid, wherein the process fluid heat exchanger is further adapted to increase a temperature of the process fluid via heat transfer with the heat transfer fluid so as to produce a heated process fluid;
    one or more partially perforated baffle plates that is in fluid communication with a process fluid inlet of the process fluid heat exchanger, wherein the one or more partially perforated baffle plates is configured to direct a flow of the process fluid into a lower portion of the process fluid heat exchanger;
    an expansion device that is adapted to receive the heat transfer fluid that exits the process fluid heat exchanger;
    a heat recovery heat exchanger that comprises an inlet that is in fluid communication with an outlet of the expansion device and an outlet that is in fluid communication with the compressor inlet, wherein the heat recovery heat exchanger is adapted to receive the heat transfer fluid that exits the outlet of the expansion device and the heated process fluid, wherein the heat recovery heat exchanger is further adapted to decrease a temperature of the heated process fluid as it flows through the heat recovery heat exchanger via heat transfer with the heat transfer fluid flowing through the heat recovery heat exchanger so as to produce a cooled process fluid that exits the heat recovery heat exchanger; and
    an overflow weir configured to fully submerge the process fluid heat exchanger.

2. The system of claim 1, wherein the heat recovery heat exchanger is further adapted to increase a temperature of the heat transfer fluid as it flows through the heat recovery heat exchanger via heat transfer with the heated process fluid flowing through the heat recovery heat exchanger so as to convert the heat transfer fluid to substantially all gas that flows to the compressor inlet.

3. The system of claim 1, wherein the process fluid is a hydrocarbon-containing process fluid.

4. The system of claim 3, wherein the hydrocarbon-containing process fluid comprises oil and water.

5. The system of claim 1, wherein the expansion device is a valve.

6. The system of claim 1, wherein the process fluid heat exchanger is one of an immersed plate type heat exchanger and a tube bundle type heat exchanger.

7. The system of claim 1, wherein the heat recovery heat exchanger is one of an immersed plate type heat exchanger and a tube bundle type heat exchanger.

8. The system of claim 1, wherein the heat transfer fluid that enters the process fluid heat exchanger consists primarily of gas at a first temperature and wherein the heat transfer fluid that exits the process fluid heat exchanger has a liquid-to-gas ratio by mass that is greater than zero and it has a second temperature that is less than the first temperature.

9. The system of claim 1, wherein the heat transfer fluid that exits the process fluid heat exchanger has a liquid-to-gas ratio by mass of at least about 90%.

10. The system of claim 8, wherein the heat transfer fluid that enters the process fluid heat exchanger and the heat transfer fluid that exits the process fluid heat exchanger are at approximately the same pressure.

11. The system of claim 8, wherein the second temperature is at least equal to or less than a dew point temperature of the heat transfer fluid at a discharge pressure of the compressor.

12. The system of claim 8, wherein the second temperature is at least 250° F. less than the first temperature.

13. The system of claim 1, wherein the heat transfer fluid that enters the process fluid heat exchanger and the heat transfer fluid that exits the process fluid heat exchanger are at approximately the same pressure.

14. The system of claim 1, wherein the heat transfer fluid that enters the expansion device has a first pressure and wherein the heat transfer fluid that exits the expansion device has a second pressure, wherein the second pressure is less than the first pressure.

15. The system of claim 14, wherein the first pressure is such that the heat transfer fluid has a dew point that is above a desired temperature of the heated process fluid and the second pressure is such that a boiling point of the heat transfer fluid is less than the desired temperature of the heated process fluid.

16. The system of claim 15, wherein the second pressure is at least 250 psia less than the first pressure.

17. The system of claim 1, wherein the one or more partially perforated baffle plates comprises a solid upper portion and a perforated lower portion, wherein the perforated lower portion includes a plurality of through holes.

18. The system of claim 1, wherein the one or more partially perforated baffle plates comprises a curved peripheral edge conforming a surface of a separator vessel, and a straight top edge located near and may optionally be connected to a run-off plate.

* * * * *